United States Patent
Zhu et al.

(10) Patent No.: US 12,294,215 B2
(45) Date of Patent: May 6, 2025

(54) REDUNDANT POWER SUPPLY, IN PARTICULAR FOR DATA CENTERS, AND METHOD AND COMPUTER PROGRAM FOR THE OPERATION THEREOF

(71) Applicant: Siemens Aktiengesellschaft, Munich (DE)

(72) Inventors: Yi Zhu, Kümmersbruck (DE); Shivansh Batra, Schwieberdingen (DE); Thomas Beckert, Nuremberg (DE); David Meulenbroeks, Utrecht (NL)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/909,853

(22) PCT Filed: Apr. 6, 2022

(86) PCT No.: PCT/EP2022/059084
§ 371 (c)(1),
(2) Date: Sep. 7, 2022

(87) PCT Pub. No.: WO2022/233525
PCT Pub. Date: Nov. 10, 2022

(65) Prior Publication Data
US 2024/0204520 A1  Jun. 20, 2024

(30) Foreign Application Priority Data
May 3, 2021 (DE) ............... 10 2021 204 436.0

(51) Int. Cl.
H02J 3/00 (2006.01)
H02J 9/06 (2006.01)

(52) U.S. Cl.
CPC .......... *H02J 3/0073* (2020.01); *H02J 3/0012* (2020.01); *H02J 9/062* (2013.01)

(58) Field of Classification Search
CPC ......... H02J 3/0073; H02J 3/0012; H02J 9/062
(Continued)

(56) References Cited

U.S. PATENT DOCUMENTS 6,433,444 B1  8/2002  De Vries
9,081,568 B1  7/2015  Ross et al.
(Continued)

FOREIGN PATENT DOCUMENTS

EP   1 890 371 A1   2/2008
EP   3 293 851 A1   3/2018

OTHER PUBLICATIONS

PCT International Search Report mailed Jul. 26, 2022, corresponding to PCT International Application No. PCT/E P2022/059084 filed Apr. 6, 2022.

*Primary Examiner* — Michael R. Fin
(74) *Attorney, Agent, or Firm* — Schmeiser, Olsen & Watts LLP

(57) ABSTRACT

A redundant power supply is provided having a first power supply, which is connectable to a busbar by a first tie switch and is disconnectably connected to a first load by a first line system, and having a second power supply, which is connectable to the busbar by a second tie switch and is disconnectably connected to the first load by a second line system, and having a third power supply, which is connectable to the busbar by a third tie switch and is disconnectably connected to a second load by a third line system, and having a fourth power supply, which is connectable to the busbar by a fourth tie switch and is disconnectably connected to the second load by a fourth line system. All of the tie switches are open during trouble-free operation.

10 Claims, 1 Drawing Sheet

(58) Field of Classification Search
USPC .................................................. 307/43, 64
See application file for complete search history.

(56) References Cited

U.S. PATENT DOCUMENTS

| | | |
|---|---|---|
| 2006/0167569 A1 | 7/2006 | Colombi et al. |
| 2006/0226706 A1* | 10/2006 | Edelen .................... H02J 9/062 |
| | | 307/64 |
| 2014/0191579 A1 | 7/2014 | Szu |
| 2015/0378408 A1 | 12/2015 | Kaplan |
| 2016/0294214 A1* | 10/2016 | Mosman ................. H02J 9/061 |
| 2017/0033595 A1* | 2/2017 | Mandarino ............... H02J 3/38 |

* cited by examiner

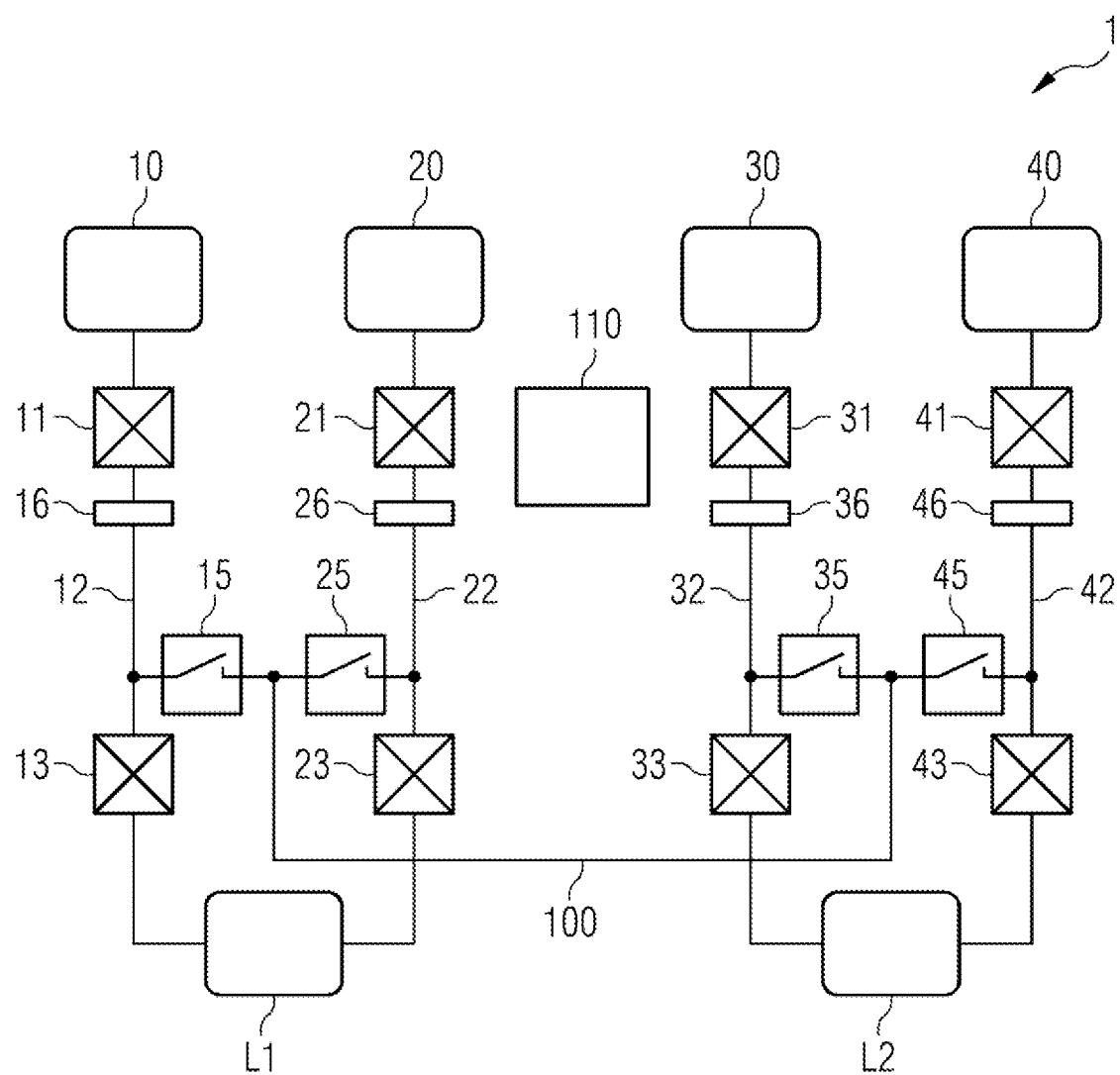

REDUNDANT POWER SUPPLY, IN PARTICULAR FOR DATA CENTERS, AND METHOD AND COMPUTER PROGRAM FOR THE OPERATION THEREOF

CROSS-REFERENCE TO RELATED APPLICATIONS

This application claims priority to PCT Application No. PCT/EP2022/059084, having a filing date of Apr. 6, 2022, which claims priority to DE Application No. 10 2021 204 436.0, having a filing date of May 3, 2021, the entire contents both of which are hereby incorporated by reference.

FIELD OF TECHNOLOGY

The following relates to a redundant power supply that is in particular suitable for data centers.

BACKGROUND

Data centers and other critical electrical facilities are required to continue operating without restriction even if elementary components such as the power supply fail.

In many cases, the power supply is therefore designed redundantly. Such a system, already expanded to include a generator and a local uninterruptible power supply, is known from US 2014/0191579 A1. A critical component of a data center is supplied with power by way of two independent power supplies. In order to ensure operation of the critical component even if one of the power supplies fails, both power supplies need to be dimensioned in such a way that each of the power supplies can reliably supply power to at least the critical component on their own. To put it another way, each power supply needs to be designed in such a way that it can bear twice the load compared to the undisturbed case. This is very uneconomical, since designing the power supply for this rare disturbance case leads to a considerable increase in the price of the individual power supplies.

U.S. Pat. No. 6,433,444 B1 discloses a system with N+2 redundancy for the power supplies that is in particular suitable for electrical facilities having high power consumption, such as entire buildings. By way of example, three critical electrical facilities are redundantly supplied with power by a total of three regular and two alternative power supplies, or six critical facilities are redundantly supplied with power by a total of six regular and two alternative power supplies. Very complex circuitry ensures that if one regular power supply fails, a first alternative power supply is used, and if another regular power supply or the first alternative power supply fails, the second power supply is used.

A somewhat different approach, a so-called "isolated-parallel rotary diesel UPS system", is disclosed in EP 1 890 371 A1. In this instance, a unified power supply grid supplies power to multiple essential and multiple critical electrical loads and there is provision for multiple diesel-operated emergency power supplies that take over the supply of power to the critical loads if the unified power supply fails. There is provision for flywheels as temporary kinetic energy stores in this case, which deliver electrical energy via a generator after the power supply has failed until the internal combustion engines of the emergency power generators have been started using the kinetic energy of the flywheels. The emergency power generators are coupled by an electrical bus system that is intended to prevent a combustion engine that does not start or does not start in time from leading to an interruption in the supply of power to the critical load assigned to the applicable emergency power generator. This system is also very complex, both mechanically and in terms of circuitry.

SUMMARY

An aspect relates to an improved redundant power supply.

In other words, embodiments of the present invention relate to subsystems each comprising a load supplied with power by two power supplies, which are couplable by a busbar in the event of a disturbance. To this end, there is provision for tie switches, by which each load and each power supply are connectable to the busbar. These tie switches are open in the trouble-free case and are selectively closed if a disturbance has been detected. Which tie switches are selectively closed depends on the type of disturbance detected.

Embodiments of the invention ensure that in the healthy operating state of the power supply each load is supplied with power directly (apart from the usual safety precautions such as line and switch disconnectors, fuses, etc.) by two power supplies each, and that in the event of a disturbance in one subsystem the power supplies of the other subsystem are connectable as well in order to supply power to the load affected by the disturbance.

This interconnection of the two subsystems, which is activable for the disturbance case or other particular operating cases, said subsystems being operated independently of one another during trouble-free or normal operation and each consisting of two power supplies and a load, advantageously means that each power supply does not need to be capable of operating the respective load on its own (as is the case in US 2014/0191579 A1, for example). Specifically, in the event of failure of (or maintenance work on) the first power supply, for example, the redundant second power supply does not need to bear the additional load on its own, but rather there is provision, in one refinement of embodiments of the invention, for selectively switching on the tie switches during impaired operation and then additionally supplying power to the first load by the third and fourth power supplies in this way.

An advantage of this for the design of the power supplies is that each power supply need not be designed for twice (200%) the load to be borne during normal operation, but rather only for 133%, since the power lost if one power supply fails can be delivered by three other power supplies. This is advantageously accomplished by automatically actuating the tie switches, that is to say with a very short time delay.

In exemplary embodiments, the present invention makes it possible to arrive at a situation in which the tie switch(es) to be switched are switched before one or more power supply module(s) are inadmissibly loaded due to a fault, for example too high a current is demanded for too long a time, and/or before a load does not receive the required electrical power due to a fault, for example the supply voltage drops below the minimum permissible value. The aforementioned criteria, that is to say loading a power supply module with too high a current and/or supplying a load with too low a voltage, possibly additionally in consideration of a time for which the respective critical state lasts, can be used as switching criteria for switching the tie switches.

Of course, the concept according to embodiments of the invention may be expanded to include further power supplies and loads, advantageously in the form of further subsystems, each consisting of two power supplies and one load, that may be connected to the busbar by tie switches, which further reduces the load to be additionally borne by the remaining power supplies if one power supply fails, or means that, if the design of the power supplies remains the same, failures of more than one power supply may also be compensated for.

In particular, there may be provision for means for detecting a disturbance for each power supply path. These may be separate components or integral with other components, for example integral together with the power supplies and/or the miniature circuit breakers and/or the circuit breakers or load interrupter switches in the current path between a power supply and a load.

These means can locally generate commands for selectively closing the tie switches and transmit them to the tie switches by wire or wirelessly by suitable transmission means. Alternatively, information about the disturbance can be transmitted to a central controller, which evaluates this information and generates control commands for the tie switches and, if necessary, the miniature circuit breakers and/or the circuit breakers or load interrupter switches in the current path between the power supply and the load and transmits them thereto by wire or wirelessly.

In one development, there may be provision for the means for detecting faults to comprise a central controller and current and/or voltage measuring means in the current paths between the power supplies and the loads, i.e., only the central controller decides whether or not there is a disturbance, based on the measured values received or based on the signals representing the measured values, and then generates and sends the commands for selectively closing one or more tie switches.

The controller may be designed to factor in the time response of the received measured values and to recognize the fault case, or to initiate measures, only when the state to be classified as a disturbance lasts for a defined and/or configurable period of time.

Embodiments of the present invention also relate to a method for operating a redundant power supply according to the invention and to a computer program that causes a processor to carry out this method.

Exemplary embodiments of the present invention are explained in more detail below with reference to a FIGURE.

BRIEF DESCRIPTION

Some of the embodiments will be described in detail, with reference to the following FIGURES, wherein like designations denote like members, wherein:

The single FIGURE shows a schematic representation of a redundant power supply 1 to which two loads L1 and L2 are connectable, according to an exemplary embodiment of the present invention. The redundant power supply 1 may be viewed as the interconnection of two basically known subsystems by a busbar 100 and tie switches 15, 25, 35, 45 (which are open during trouble-free operation).

DETAILED DESCRIPTION

The first subsystem, on the left in the illustration, comprises a first power supply module 10 and a second power supply module 20. The first power supply module 10 is connected to a first line system 12 by a source-side fuse device 11. The source-side fuse device 11 is a commercially available fuse device.

The second power supply module 20 is connected to a second line system 22 by a source-side fuse device 21. The source-side fuse device 21 is also a commercially available fuse device.

A first load L1 is connected to the first line system 12, specifically by a load-side fuse device 13. The load-side fuse device 13 is also a conventional fuse device.

The first load L1 is likewise connected to the second line system 22, specifically by a load-side fuse device 23. The load-side fuse device 23 is also a conventional fuse device.

There is furthermore provision, with regard to the first power supply 10 and/or in the first current path 12, for a first device 16, which can be used to detect disturbances on the first power supply 10 and/or on the first current path 12, in particular for example failure of the first power supply 10 or an interruption to the first current path 12. The first device 16 may be a current measuring means and/or a voltage measuring means. The device 16 may be designed to detect disturbances independently, or to transfer measured values to a central controller 110 continuously or at discrete times or on an event-related basis, said controller then detecting a disturbance from the measured values.

There is provision for a corresponding second device 26 with regard to the second power supply 20 and/or in the second current path 22, which second device can be used to detect disturbances on the second power supply 20 and/or on the second current path 22, in particular for example failure of the second power supply 20 or an interruption to the second current path 22. The second device 26 may likewise be a current measuring means and/or a voltage measuring means. The second device 26 may be designed to detect disturbances independently, or to transfer measured values to a central controller 110 continuously or at discrete times or on an event-related basis, said controller then detecting a disturbance from the measured values.

The second subsystem, on the right in the illustration, comprises a third power supply module 30 and a fourth power supply module 40, which are connected to a corresponding third and fourth line system 32, 42 via respective source-side fuse devices 31, 41. A second load L2 is connected both to the third and to the fourth line system 32, 42 by way of applicable load-side fuse devices 33, 43.

There is provision for a third device 36 and a fourth device 46 with regard to the third or fourth power supply 30, 40 and/or in the third or fourth current path 32, 42, which third device can be used to detect disturbances on the third or fourth power supply 30, 40 and/or on the third or fourth current path 32, 42. The operation and properties of the third and fourth devices 36, 46 are consistent with those of the first and second devices 16, 26, as described above.

According to embodiments of the invention, as already explained, there is provision for multiple tie switches 15, 25, 35, 45 in order to connect the two subsystems to a busbar 100 and to one another by the busbar 100 if necessary, in particular in the event of a disturbance.

A first tie switch 15 connects the first line system 12 to the busbar 100 as required, a second tie switch 25 connects the second line system 22 to the busbar 100 as required, a third tie switch 35 connects the third line system 32 to the busbar 100 as required and a fourth tie switch 45 connects the fourth line system 42 to the busbar 100 as required. This means that each power supply module is coupled to a load directly, that is to say without a tie switch, and is connectable to the busbar 100 by a tie switch. The loads are in turn each connectable to the busbar 100 via a tie switch.

Considering the example of the first power supply 10, the first load L1 is thus connected to the first power supply 10 without a tie switch, via line system 12, and the first power supply is connectable to the busbar, likewise via line system 12, by the first tie switch 15. This allows the first power supply, after the first tie switch 15 is selectively closed, to deliver power to the second load L2, if required, via the first line system 12, the first tie switch 15 and the busbar 100, namely by the third and/or the fourth tie switch 35, 45, which then also needs to be closed, and the third and/or the fourth line system 32, 42. In addition, there is an alternative supply path from the first power supply 10 to the first load L1 via the second tie switch 25, which needs to be closed if necessary, and the second line system 22, for example in the event that the supply line to the first load L1, which line is protected by the fuse device 13, is subject to a disturbance.

In order to achieve this, the tie switches 15, 25, 35, 45 are all open during normal operation and are automatically and selectively closed in the event of a disturbance, depending on the respective disturbance. It goes without saying that the rated voltages in the two subsystems must be at least approximately the same and that, in the case of AC voltage, phase synchronism must exist or be established in order to avoid undesirable effects. Devices and methods in this regard are within the scope of what is customary in the art and are not considered in more detail here. It is also advantageous to switch on the tie switches if necessary in such a way that inrush currents are heeded and minimized. In the case of AC voltage, for example, it is advantageous to actuate the tie switches in such a way that they are closed at or near the zero crossing of the current or the voltage.

As already explained above, embodiments of the present invention provide significant advantages for the design of the power supply modules 10, 20, 30, 40. In addition, an expansion to include further subsystems is possible without any problems and it is also conceivable to provide an odd number of power supply modules. The description relating to the subsystems has been chosen here for illustrative purposes only, because such subsystems are often already found in existing installations and can be converted into a redundant power supply according to embodiments of the present invention at low cost.

This is significant, for example, when expanding an existing system, such as a data center. A first subsystem will generally already be present here, with the usual design of the power supply modules such that each of the power supply modules is able to supply power to the load of the first subsystem on its own. If a second subsystem is now intended to be installed, the first subsystem is simply expanded to include two branches on the line systems and the controllable coupling switches and then connected to the new busbar—no further changes are required and the already existing (now actually oversized) power supply modules can continue to be used or may be replaced by more efficient modules as needed.

In exemplary embodiments, the redundant power supply 1 comprises a controller 110, the function of which is described in detail below. As already discussed, the controller may be in central form or decentralized, i.e., distributed over other components, for example the power supplies 10, 20, 30, 40 or the line circuit breakers or circuit breakers 11, 21, 31, 41. For the sake of clarity, the signal and/or command lines required in some cases between the power supply modules 10, 20, 30, 40 and the controller 110 and/or between the fuse devices 11, 13, 21, 23, 31, 33, 41, 43 and the controller 110 and/or among the tie switches 15, 25, 35, 45 and/or the cited components have not been shown.

Three fault scenarios are particularly relevant for the power supply system shown in the FIGURE, and these will be considered below.

The first fault scenario relates to the failure or maintenance of a power supply module. Without limiting the generality, the case will be considered that the first power supply module 10 is not available or the source-side fuse device 11 is defective, for example, and, as a result, no energy can be provided by the first power supply module 10.

This fault scenario is resolved by virtue of all four tie switches being closed and thus the remaining power supply modules 20, 30, 40 supplying power to the first load L1 jointly. From the point of view of the first load L1, the failure of the first power supply module 10 is almost completely transparent: only for the short period of time until the tie switches are closed is there a power supply only on one side, i.e., only on one of the two power supply connections of the load L1.

After the tie switches are closed, electrical power is routed to the redundant power supply paths 12, 22 of the first load L1 from the third and the fourth power supply via the busbar 100, and electrical power can thus be demanded by the load L1 from both power supply paths equally, as in the trouble-free case.

The second power supply 20 needs to supply power to the load L1 on its own only for the period of time up to the closing of the tie switches. The design of the components of the power supply 1 is therefore chosen so that the time between the occurrence of the fault and the closing of the tie switches, i.e., the time required for fault detection and command generation and execution, is less than the time after which the power supply 20 is switched off due to the temporary overload and/or trips the source-side fuse device 21.

In advantageous refinements, this can be achieved for all fault scenarios described here by using electronic switches as tie switches. So-called solid state circuit breakers (abbreviation SSCB, sometimes also SCCB) are particularly desired. The use of electronic switches has the advantage that the closing of the tie switches can take place so quickly that tripping of the usual protective means 11, 13, 21, 23, 31, 33, 41, 43 due to the fault (which would lead to functional restrictions) is avoided. In more general terms, in exemplary embodiments, the switching speed of the tie switches is selected to be faster than the tripping characteristic of the source-side protective devices 11, 21, 31, 41 and/or than the tripping characteristic of the load-side protective devices 12, 23, 33, 43.

The second fault scenario is that a disturbance occurs in one of the line systems 12, 22, 32, 42 that can be assigned to the individual power supply modules while all four power supply modules 10, 20, 30, 40 are working correctly, that is to say for example if a disturbance occurs in the line section between the first power supply 10 and the first tie switch 15 and/or in the line section between the first power supply 10 and the first load L1 or the first tie switch 15 causes a short circuit.

This fault scenario is resolved by virtue of the second, the third and the fourth tie switch 25, 35, 45 being closed, but not the first tie switch 15, so as not to supply additional energy to the fault. Moreover, the fault is isolated by virtue of the source-side fuse device 11 and/or the load-side fuse device 13 of the first line system 12 being opened, provided they have not already been tripped anyway due to the fault.

From the point of view of the first load L1, the second fault scenario is not transparent, but uninterrupted operation is ensured by a power supply on only one side in that case via the load-side fuse device 23. After the tie switches 25, 35, 45 are closed, additional electrical power is routed to the first load L1 from the third and fourth power supplies via the busbar 100 and the remaining power supply path 22 shown on the right.

Again, the second power supply needs to supply power to the load L1 on its own only for the period of time up to the closing of the tie switches. What has been said in relation to the first fault scenario applies to the design of the components of the power supply 1.

The third fault scenario relates to a disturbance on the busbar 100. This fault scenario has no effects on normal operation of the power supply 1, since the busbar is isolated from the rest of the arrangement during normal operation due to the tie switches 15, 25, 35, 45 being open by default.

However, the third fault scenario affects the handling of faults in accordance with the first or the second fault scenario. In many instances of the third fault scenario, for example a short circuit in the region of the busbar 100, it is no longer possible to remedy the first or second fault scenario. Only in the case of a low-level fault involving an amount of electrical energy that is tolerable for a certain period of time being lost at the busbar 100, i.e., there is a fault that is not a short circuit, for example, is it possible to remedy the first or second fault scenario for this period of time if the third fault scenario exists at the same time.

In exemplary embodiments of the present invention, the busbar 100 is therefore automatically tested occasionally or continuously, e.g., by resistance or impedance measurements on the bus conductors with reference to one another and to ground, said measurements being well known to those skilled in the art. If a tolerable fault is identified, it is signalled to an operator of the system, but the automatic fault rectification of the first or second fault scenario is not deactivated. If an intolerable fault is identified, an urgent alarm is output to the operator and the automatic fault rectification of the first or second fault scenario is deactivated.

In alternative exemplary embodiments, the busbar 100 is not tested occasionally or continuously, but rather, following activation of the tie switches to remedy the first or second fault scenario, monitoring of the currents that subsequently flow is used to detect whether an inadmissibly large amount of power is flowing away from one of the remaining power supplies 20, 30, 40, and if so the tie switch closest to this power supply is deactivated as a first remedial measure. This is done separately for all power supplies.

If an intolerable case of the third fault scenario exists together with the first or the second fault scenario, all of the tie switches are opened again in this way and the two subsystems are again isolated from one another. The subsystem shown on the right then functions as in the unimpaired operating state, while in the subsystem shown on the left the load L1 is now supplied with power only by the second power supply 20. For certain operating cases, this is still a functioning operating state, namely when the energy consumption of the load L1 is currently well below the maximum value and the second power supply can therefore supply power to the first load L1 without getting into an overload state. However, if the first load L1 consumes its maximum permissible electrical power, the second power supply 20 is overloaded and is disconnected from the first load L1 or switched off, for example by the source-side fuse device 21 or by internal protective devices.

The first fault scenario described above may be detected in various ways. First, it is possible to implement self-testing means in the power supplies 10, 20, 30, 40, which output an OK signal when and only when the applicable power supply is activated and is working correctly. Thus, if the first power supply fails or is switched off for maintenance purposes, for example, the OK signal from this power supply disappears and a switch-on command to all of the tie switches is immediately generated, sent and executed.

Alternatively or additionally, the current may be measured by current measuring means in the path between a power supply and the respective load. If said current drops below a specific value, a fault in the power supply is assumed and all of the tie switches are switched on. This may be supplemented by an evaluation of the current flowing in the other path of the respective load. If one of the current values is very low and the other is constant or increasing, a fault in the power supply whose value is low is assumed, and all of the tie switches are switched on.

Alternatively or additionally, the voltage at the output of the power supplies or along the current paths between the power supply and the load may be evaluated. If the voltage at the output and/or on this line falls below a specific value compared to a reference-ground potential, a fault in the power supply is assumed and all of the tie switches are switched on. In the case of AC voltage, the peak or rms value of the voltage may be evaluated, for example.

In addition, in the first fault case, the power supply assumed to be faulty may be isolated from the overall system by opening the respective source-side fuse device 11, 21, 31, 41.

As already explained, the measuring means may be independent devices 16, 26, 36, 46 or integrated in the power supplies 10, 20, 30, 40 or the source-side fuse devices 11, 21, 31, 41 or distributed over both components, for example voltage measuring means in one component and current measuring means in the other component. Of course, it is also possible to use existing measuring means in the fuse devices 11, 21, 31, 41, in particular when these fuse devices are electronic fuse devices such as solid state circuit breakers.

The second fault scenario described above may also be detected by way of current and/or voltage measurements by the measuring means described with regard to the recognition of the first fault scenario. In the second fault scenario, without limiting the generality, a fault on the first line system 12 will again be considered; the current through the current measuring means increases sharply in the event of a short circuit and may trip the source-side fuse device 11. The strong increase and/or the exceeding of a maximum permissible value and/or the tripping of the source-side fuse device 11 may be used as criteria to close the tie switches 25, 35, 45 and to keep the tie switch 15 open.

Alternatively or additionally, here too the voltage at the output of the power supplies or along the current paths between the power supply and the load may be evaluated. If this voltage drops rapidly, i.e., with a large negative increase, and/or below a specific value, a fault on the line system is assumed if an OK signal is received from the power supply at the same time. The tie switches 25, 35, 45 are switched on as described above and the tie switch 15 is kept open.

If, on the other hand, an inadmissibly high line resistance/impedance up to a line break occurs in the second fault scenario, this is detected by way of a flow of current in this current path possibly dropping to zero with a simultaneously increasing flow of current in the other current path to the applicable load, or alternatively by way of a flow of current in this current path possibly dropping to zero with simultaneous OK signalling from the respective power supply, or alternatively by way of a flow of current in this current path possibly dropping to zero with a simultaneously increasing or constant voltage at the output of the respective power supply.

In this case too, the fault is rectified by closing the tie switches that are not connected to the current path in question and leaving the tie switch that is connected to the current path in question open.

In addition, in the second fault case too, the line assumed to be faulty may be isolated from the overall system by opening the respective source-side fuse device 11, 21, 31, 41 and/or the respective load-side fuse device 13, 23, 33, 43.

The third fault scenario may be detected using the means shown in FIG. 1 only if the first or the second fault scenario also arises at the same time. The applicable methods have already been described above. It is additionally possible to test the busbar 100 by closing only one of the tie switches and evaluating the current flowing in the applicable branch, for example closing the first tie switch 15 and evaluating the current delivered by the first power supply 10, or the current flowing through component 11 or the current flowing through component 16. If said current remains constant, there is no fault in accordance with the third scenario. If the current increases solely due to the closing of the tie switch, there is probably a fault in accordance with the third fault scenario, which is signalled to an operator of the system and, as already described above, may lead to deactivation of the automatic fault rectification in accordance with the first or second fault scenario.

As already mentioned, the fault recognition may be carried out centrally by a controller 110 or in a decentralized manner by a distributed controller or by controllers implemented locally for each power supply that send applicable commands to all of the tie switches. In the latter case, it is desirable to ensure that an "Open" command for a tie switch has priority over a simultaneous or immediate "Close" command in order to prevent the third fault scenario, together with the first or the second fault scenario, from leading to the subsystem that is not affected by the fault becoming inoperable as well.

The central controller 110, if present, may be set up to receive pre-processed information, that is to say for example signals from the means 11, 16, 21, 26, 31, 36, 41, 46 for disturbance recognition that identify a disturbance for the applicable power supply 10, 20, 30, 40 and/or for the applicable current path 12, 22, 32, 42 and forward said disturbance to the central controller 110, whereupon the central controller, depending on the type of disturbance signaled, generates appropriate commands to selectively close or keep open the tie switches 15, 25, 35, 45 and sends said commands to the tie switches.

Alternatively, the central controller may be set up to receive measured values from measuring means arranged in each power supply branch, in particular current and/or voltage measuring means, and to evaluate these measured values and/or the time response thereof as described in connection with the recognition of the various fault scenarios and to generate appropriate commands to selectively close or keep open the tie switches 15, 25, 35, 45 and to send said commands to the tie switches.

In addition, the controller can generate the disconnect commands suitable for isolating a recognized fault and send them to the respective fuse devices 11, 13, 21, 23, 31, 33, 41, 43.

In all of the fault scenarios, an alarm may be output to an operator in addition to the rectification and possibly isolation of the fault.

From application to application, it is necessary to consider whether it is desirable to use to a central controller, which needs to monitor at least four channels, or to a decentralized solution, for example with accordingly more complex source-side fuse devices and/or tie switches.

It should be pointed out that embodiments of the present invention entail a certain amount of implementation effort, but this should be worthwhile in most cases, because only embodiments of the present invention enable the use of significantly smaller power supply modules (as already explained, the power supply modules need only be designed for 133% of the normal load, compared to 200% of the normal load in the case of subsystems operated in isolation that are not equipped according to embodiments of the invention) and, at the same time, all relevant fault scenarios can be detected in good time, and the faults automatically isolated, in such a way that operation of the loads L1, L2 is not impaired. In addition, embodiments of the present invention allow the respective fault to be rectified without the loads L1, L2 having to be switched off for this purpose.

It should also be pointed out again that only the minimum configuration has been described in detail here and expansion to include further subsystems is possible without any problems. Incomplete subsystems are also conceivable, that is to say for example the connection of a further load with only one additional power supply module, so that for example five power supply modules supply power to three loads (not shown).

Finally, it should be pointed out that the exemplary embodiments described above may be combined with one another as desired. It should also be pointed out that the term "controller" as used here includes processors and processing units in the broadest sense, that is to say for example general-purpose processors, graphics processors, digital signal processors, application-specific integrated circuits (ASICs), programmable logic circuits such as FPGAs, discrete analog or digital circuits and any combination thereof, including any other processing units known to those skilled in the art or developed in future. Processors may consist of one or more devices. When a processor consists of multiple devices, these may be configured to process instructions in parallel or sequentially.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A redundant power supply comprising the following:
a first power supply, which is connectable to a busbar by a first tie switch and is disconnectably connected to a first load by a first line system;
a second power supply, which is connectable to the busbar by a second tie switch and is disconnectably connected to the first load by a second line system;
a third power supply, which is connectable to the busbar by a third tie switch and is disconnectably connected to a second load by a third line system;
a fourth power supply, which is connectable to the busbar by a fourth tie switch and is disconnectably connected to the second load by a fourth line system;
wherein all of the tie switches are open during normal operation of the power supplies and the loads;

wherein a disturbance is detected on a power supply and/or a line system when a determined current differs from a target value for normal operation and/or when a fault current exceeds a threshold for normal operation; and wherein, when the disturbance is detected, the redundant power supply is configured to interrupt normal operation and close one or more of the tie switches so that each of the loads is then connected to three functioning power supplies and/or three functioning line systems.

2. The redundant power supply as claimed in claim 1, comprising means for detecting the disturbance and means for selectively closing one or more tie switches.

3. The redundant power supply as claimed in claim 2, in which the means for detecting the disturbance are configured to be integral with the power supplies and/or integral with miniature circuit breakers and/or circuit breakers of the line systems.

4. The redundant power supply as claimed in claim 2, in which the means for detecting the disturbance comprise current and/or voltage measuring means.

5. The redundant power supply as claimed in claim 2, in which the means for selectively closing the tie switch or switches are configured to be integral with the power supplies and/or integral with the miniature circuit breakers and/or the circuit breakers of the line systems.

6. The redundant power supply as claimed in claim 1, further comprising a central controller.

7. The redundant power supply as claimed in claim 6, in which:
   the current and/or voltage measuring means additionally comprise means for transferring measured values to the central controller;
   the controller comprises means for receiving the measured values from all of the current and/or voltage measuring means; and
   the controller comprises means for identifying the disturbance if at least one of the measured values differs from a target value and also means for selecting the tie switch or switches to be closed and means for sending a close command to the tie switch or switches to be closed.

8. A method for operating a redundant power supply, comprising:
   providing a first power supply, which is connectable to a busbar by a first tie switch and is disconnectably connected to a first load by a first line system;
   providing a second power supply, which is connectable to the busbar by a second tie switch and is disconnectably connected to the first load by a second line system;
   providing a third power supply, which is connectable to the busbar by a third tie switch and is disconnectably connected to a second load by a third line system;
   providing a fourth power supply, which is connectable to the busbar by a fourth tie switch and is disconnectably connected to the second load by a fourth line system;
   for each power supply and/or for each line between a respective power supply and the respective load supplied with power by the respective power supply during normal operation, determining a current flowing from the respective power supply to the respective load and/or determining a fault current;
   identifying a disturbance on a power supply or on a line if the determined current differs from a target value for normal operation and/or if the fault current exceeds a threshold value for normal operation; and
   closing one or more tie switches in such a way that normal operation is interrupted and each of the loads is then connected to three power supplies.

9. The method as claimed in claim 8, additionally comprising a step of isolating a power supply and/or a line for which the disturbance has been identified by actuating line circuit breakers and/or circuit breakers arranged between the power supply and the load.

10. A computer program having non-transitory machine-readable instructions for implementing the method as claimed in claim 8.

\* \* \* \* \*